United States Patent [19]

Schmidt et al.

[11] Patent Number: 4,529,264
[45] Date of Patent: Jul. 16, 1985

[54] DEVICE FOR SHARP-EDGE ILLUMINATION OF AN OBSERVATION FIELD LYING IN A PRESELECTABLE PLANE

[75] Inventors: Wilhelm Schmidt, Rainau-Buch; Karl Grünvogel; Lothar Rübl, both of Aalen, all of Fed. Rep. of Germany

[73] Assignee: Carl-Zeiss-Stiftung, Heidenheum/Brenz, Oberkochen, Fed. Rep. of Germany

[21] Appl. No.: 469,744

[22] Filed: Feb. 25, 1983

[30] Foreign Application Priority Data

Mar. 26, 1982 [DE] Fed. Rep. of Germany ....... 3211187

[51] Int. Cl.³ ............................ G02B 5/16; G02B 7/26
[52] U.S. Cl. ............................... 350/96.20; 350/96.10; 350/96.18; 350/96.24; 350/523; 362/32
[58] Field of Search ............... 350/96.10, 96.15, 96.18, 350/96.20, 96.24, 96.25, 96.26, 96.28, 523, 544, 546, 167; 362/32

[56] References Cited

U.S. PATENT DOCUMENTS

| | | | |
|---|---|---|---|
| 3,669,524 | 6/1972 | Shio | 350/96.24 |
| 4,153,333 | 5/1979 | Harada et al. | 350/96.25 |
| 4,215,937 | 8/1980 | Borsuk | 350/96.15 |
| 4,234,910 | 11/1980 | Price | 350/96.10 |
| 4,264,122 | 4/1981 | Schmidt et al. | 350/551 |
| 4,363,532 | 12/1982 | Weber | 350/523 |
| 4,365,864 | 12/1982 | Cowley et al. | 350/96.15 |
| 4,415,240 | 11/1983 | Nishioka et al. | 350/96.10 |

FOREIGN PATENT DOCUMENTS 1425097  12/1965  France ............................... 350/96.26

OTHER PUBLICATIONS

Resua et al., *Microscope* (GB), vol. 28, No. 2, 1980, "Fiber Optics Illumination for Use in Dispersion Staining", pp. 51–55.

*Primary Examiner*—James W. Davie
*Assistant Examiner*—Frank González
*Attorney, Agent, or Firm*—Hopgood, Calimafde, Kalil, Blaustein & Judlowe

[57] ABSTRACT

A device for sharp-edge uniform illumination of an observation field lying in a preselectable plane is adapted to utilize light from a remote source, via a flexible fiber-optic connection having a glass-rod termination for producing a uniformly illuminated light-exit surface. The glass rod is insertably connected to the device via clamping mechanism (9, 10) in such manner that its light-radiating surface is immediately adjacent to a diaphragm (7). In front of the diaphragm (7), a collector (2, 3) is fixedly positioned, to focus the diaphragm as a real image in the observation plane. The diaphragm (7) (together with the glass rod) is displaceable axially with respect to the collector (2, 3), thus enabling sharp adjustment for different distances from the observation plane.

7 Claims, 3 Drawing Figures

Fig. 1
Fig. 2
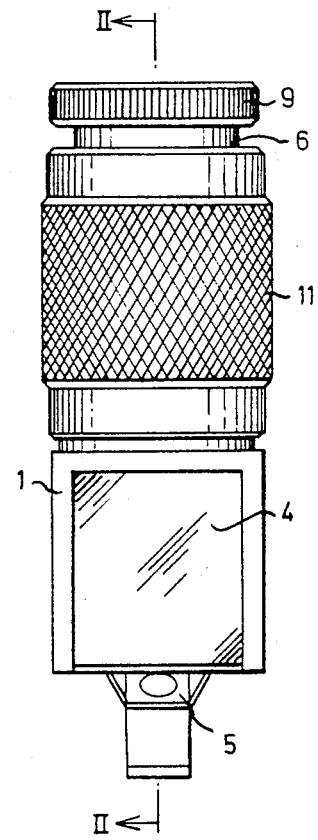
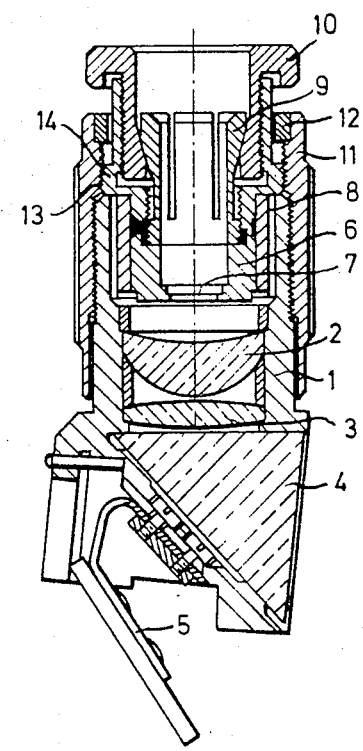

DEVICE FOR SHARP-EDGE ILLUMINATION OF AN OBSERVATION FIELD LYING IN A PRESELECTABLE PLANE

BACKGROUND OF THE INVENTION

The present invention relates to a device for the sharp-edge illumination of a field of observation lying in a preselectable plane. Such devices are used preferably in combination with a viewing aid, in particular a magnifying viewing aid. Typically, a magnifying viewing aid comprises binocular magnifiers in which a magnifying optical system in a tube is associated with each eye of the observer. By adjusting the angle of convergence of these tubes, such a viewing aid, as known, for instance, from West German Patent Application (Offenlegungsschrift) No. 2,843,835, can be adjusted to different working distances. In order to permit the wearer of such a viewing aid optimal observation, it is important that the field of observation be illuminated as uniformly as possible from the center to the edge, regardless of the working distance selected.

Illuminating systems for viewing aids, particularly magnifying viewing aids, must illuminate the observed field at all times, i.e., they must be worn by the observer in such manner that they participate in all movements of his head and the involved changes in viewing direction. For this reason, the illuminating system is advisedly fastened to a head band or directly to the viewing aid. For example, in the viewing aid known from the said patent application, the illuminating system can be connected directly to the pivot axis.

With such attachment of an illuminating system, there follows a need for the lowest possible weight and the smallest possible development of heat.

It is already known to provide a separate light source and to connect it to the illuminating system via a fiber-optical light guide. This solution has the advantage that the illuminating system which is to be worn by the observer can be made small and lightweight and is thermally decoupled from the light source.

The illuminating system worn by the observer consists, in one such solution, essentially of a mount for the light guide, a collector for focusing the light-emitting surface of the light guide into the plane of observation, and possibly a mirror for reflection of the light.

In a fiber-optical light guide, the light-emitting end surface has a honeycomb structure. Therefore, it is not possible to obtain approximately uniform illumination of the field by forming a real image of this end surface in the observation plane. Recourse is had to selecting the distance between the end surface of the light guide and the collector system in such manner that sharp focusing of the end surface is not obtained in the observation plane. As a result, the honeycomb structure is blurred, but, on the other hand, field illumination materially decreases toward the edge, and blurred-edge limits of such illumination must be tolerated. Such field illumination is not sufficient to meet the demands of use with magnifying viewing aids.

BRIEF STATEMENT OF THE INVENTION

The object of the present invention is to provide a device for illuminating a field of observation with sharply defined, uniform illumination at any preselectable distance from the observation plane.

To achieve this object, use is made of the fact, known from the field of microscopy, that a stuctureless light-exit surface can be produced by means of a glass rod placed on the end of a fiber-optical light guide. A diaphragm is arranged directly in front of the radiating surface of the glass rod, and, to form a real image of the diaphragm in the observation plane, a collector having a variable distance from the diaphragm is provided.

The diaphragm produces a sharp delimitation of the uniformly illuminated light-exit surface of the glass rod. The diaphragm is projected by the collector as a real image into the observation plane, a dependable image of the diaphragm being obtained, for each distance between this plane and the viewer, by suitable selection of the distance between the diaphragm and the collector. The size of the illuminated field depends, of course, on distance from the observation plane.

If the size of the illuminated field is to be selected separately in accordance with certain criteria, then a diaphragm of adjustable aperture, for instance an iris diaphragm, is advantageously used. The same result can also be obtained with a diaphragm of constant aperture by changing the refractive power of the collector. Thus, for example, the collector can be developed as a zoom system, i.e., as a system of continuously variable focal length.

DETAILED DESCRIPTION

The invention will be described in detail for an illustrative embodiment, shown in the accompanying drawings. In said drawings:

FIG. 1 is a side view in elevation;

FIG. 2 is a longitudinal section, taken in the plane II—II of FIG. 1; and

Figure 3:
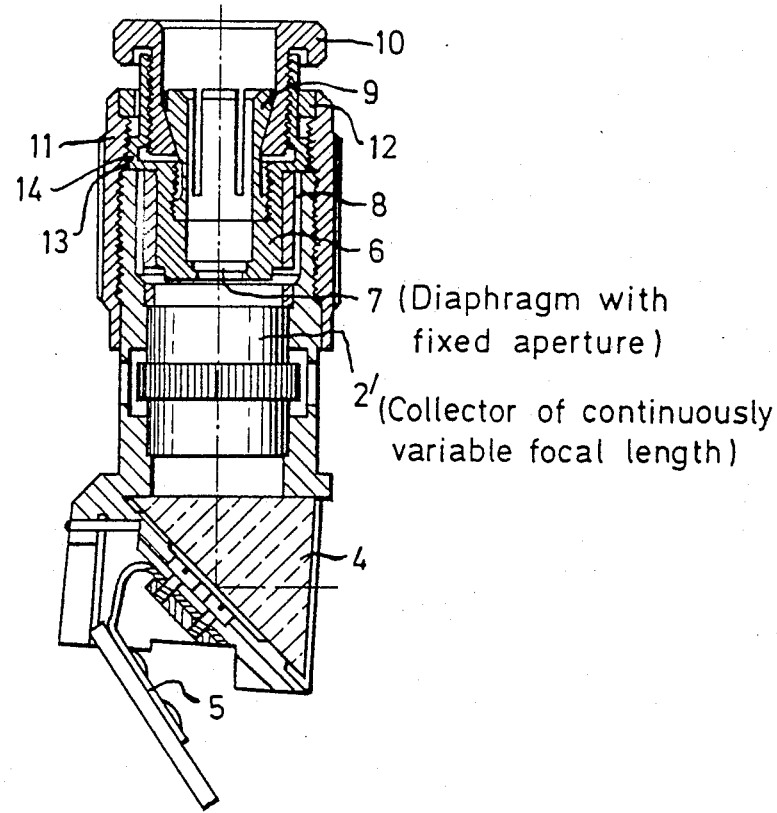
FIG. 3 is a view similar to FIG. 2 to show a modification.

In the drawings, a cylindrical housing 1 fixedly mounts a collector consisting of two individual lenses 2 and 3. The housing 1 also mounts a prism 4 which serves to deflect the illumination ray path towards the observation field when the device is used with a viewing aid. Clamping mechanism 5 is provided for detachable connection of the device to a viewing aid, particularly a magnifying viewing aid.

It is clear that, instead of prism 4, a reflecting mirror could be used and that such a mirror could also be mounted so as to be inclinable with respect to housing 1.

The lower end of another structural part 6 is developed as a diaphragm 7 of constant aperture. Part 6 is rigidly connected to a sleeve 8 having external splines which engage inner splines of housing 1. In this way, keyed linear guidance of structural part 6 is assured.

A slitted sleeve or collet 9 is arranged within and securely connected to part 6; sleeve 9 serves to receive the fiber-optical light guide and its connected glass rod, the glass rod being inserted such a distance that its light-radiating end directly abuts diaphragm 7 and spans its aperture. The outer profile of sleeve 9 is of conical wedge shape and cooperates with a corresponding conical wedge-shaped bore at the lower end of a knurled sleeve 10. The knurled sleeve 10 has threaded connection with part 6; when turned in one direction, it moves upward to thereby clamp an inserted light guide in the sleeve 9, via the cooperating wedges.

Housing 1 is surrounded by and threadedly engaged to a knurled ring 11 which carries a stop ring 12 at its upper end. Ring 11 also has threaded engagement at 13 to a shoulder 14 of part 6.

To set the device for different observation distances, the knurled ring 11 is rotated, thereby axially displacing the structural part 6 and thus the clamped light guide and diaphragm 7, with respect to the fixed collector 2, 3. If diaphragm 7 is arranged in the rear focal plane of the collector 2, 3, then a sharp-edge illumination field lying at infinity is illuminated; the illuminated sharp-edge observation field is produced at lesser distances from the observer, by axial displacement of the light guide and diaphragm 7 in the upward direction, within the range limited by abutment of shoulder 14 with stop ring 12.

In FIG. 3, the collector is developed as a zoom system 2', i.e., as a system of continuously variable focal length.

In the above description, mention has been made of a glass rod which is placed on the end of the fiber-optical light guide. This rod need not necessarily be made of glass; it may, for example, also consist of some other transparent material, which material may be colored, if it is not intended to provide white-light illumination of the observation field.

What is claimed is:

1. A device for sharp-edge, uniform illumination of a field of observation lying in a preselectable plane by means of a light source and an associated fiber-optical light guide, wherein a glass rod terminates the free end of the light guide, characterized by the fact that a diaphragm (7) is arranged directly in front of the radiating end surface of said glass rod and that, for the formation of a real image of this diaphragm in the observation plane, a collector (2, 3) is arranged at variable distance from the diaphragm.

2. A device according to claim 1, characterized by the fact that said diaphragm has an adjustable aperture.

3. A device according to claim 1, characterized by the fact that said diaphragm is of constant aperture and that said collector is developed as an optical system of continuously variable focal length.

4. A device according to claim 1, characterized by the fact that said collector (2, 3) is fixedly positioned in a cylindrical housing (1), that a structural part (6) includes said diaphragm (7) and is mounted for axial displacement in said housing (1), that clamping mechanism (9, 10) is connected to said structural part for clamping the light guide in a position in which the radiating end surface of the glass rod connected to the light guide is directly adjacent the diaphragm (7), and that the cylindrical housing (1) is surrounded by a knurled ring (11) which serves for selective axial displacement of the diaphragm with respect to the collector.

5. A device according to claim 4, characterized by the fact that the cylindrical housing (1) carries a prism (4) for deflecting the illuminating ray path passing through the collector (2, 3).

6. A device according to claim 5, and including mounting structure (5) adapted for detachable mounting of said device, said mounting structure being connected to said cylindrical housing (1).

7. A field-illumination device adapted to receive input light from the exit plane of a rod-terminated optical fiber, said device including a tubular housing and collector-lens means fixedly mounted therein, collet means having a fixed internal stop and associated diaphragm for releasably clamping an inserted rod at said stop, with the exit end of the rod immediately adjacent the diaphragm, and an adjustment mechanism coacting between said collet means and said housing for selectively varying the axial offset of said collector-lens means from said diaphragm, whereby the diaphragm is sharply imaged at selectively varied observation distance from said device.

* * * * *